United States Patent
Isotalo

(10) Patent No.: US 6,671,366 B1
(45) Date of Patent: Dec. 30, 2003

(54) METHOD OF CONNECTING CALLS

(75) Inventor: Lauri Isotalo, Helsinki (FI)

(73) Assignee: Helsingin Puhelin Oyj-Helsingfors Telefon Abp, Helsinki (FI)

(*) Notice: Subject to any disclaimer, the term of this patent is extended or adjusted under 35 U.S.C. 154(b) by 0 days.

(21) Appl. No.: 09/622,012

(22) PCT Filed: Feb. 12, 1999

(86) PCT No.: PCT/FI99/00118
§ 371 (c)(1),
(2), (4) Date: Oct. 5, 2000

(87) PCT Pub. No.: WO99/44373
PCT Pub. Date: Sep. 2, 1999

(30) Foreign Application Priority Data

Feb. 12, 1998 (FI) .................................................. 980327

(51) Int. Cl.[7] .............................................. H04M 7/00
(52) U.S. Cl. ............. 379/221.08; 379/219; 379/265.01
(58) Field of Search .......................... 379/219, 210.01, 379/221.08, 221.09, 265.02

(56) References Cited

U.S. PATENT DOCUMENTS 5,036,535 A * 7/1991 Gechter et al. ........ 379/265.11
5,271,058 A * 12/1993 Andrews et al. ....... 379/265.11

FOREIGN PATENT DOCUMENTS

| EP | A2549126 | 6/1993 |
| EP | A2501513 | 9/1993 |
| WO | A1-9615633 | 5/1996 |

* cited by examiner

Primary Examiner—Ahmad F. Matar
Assistant Examiner—Rasha Al-Aubaidi
(74) Attorney, Agent, or Firm—Birch, Stewart, Kolasch & Birch, LLP

(57) ABSTRACT

The invention relates to a method for setting up telephone calls between connections of a public telephone network and such connections of the public telephone network as are connected under the control of the method, such as the connections of a distributed call center or a virtual PBX. In the method, a call setup request is received, a connection corresponding to the setup request is sought, and the call is connected to this connection. When using the method according to the invention, data on the state of each controlled connection is entered in a database (8) and, when searching for a connection corresponding to the setup request, the data on the state of at least one controlled connection is accessed from database (8) and a decision, as to which controlled connection to connect the call to, is made using the data checked in database (8).

1 Claim, 5 Drawing Sheets

METHOD OF CONNECTING CALLS

This application its the national phase under 35 U.S.C. §371 of PCT International Application No. PCT/FI99/00118 which has an International filing date of Feb. 12, 1999, which designated the United States of America.

The present invention relates to a method according to the preamble of claim 1.

The method to which the invention relates is used to control calls in a distributed call center or in a virtual PBX (Private Branch Exhange).

A distributed call center means a call center, the telephone connections of which can be located in several different telephone exchanges, for example, indifferent parts of the country. A call made to a telephone number of a distributed call center is directed to one of the connections belonging to the call center. A distributed call center is very suitable, for example, for implementing help-desk services, as those who clan be contacted at the telephone number of the call center can work at home and experts in different localities can be gathered in the call center.

In turn, a virtual PBX refers to an arrangement, in which the telephone connections connected under the virtual PBX are controlled in the same way as a conventional PBX controls its extension numbers. A functioning virtual PBX permits, for example, the telephone lines and mobile phone connections of the various units of a large company to be controlled from a single service point, making it easier to contact the employees. A customer calling the company's number would then have a better chance of contacting the person he or she wants to or his or her deputy, irrespective of which unit the person is working in at that precise moment. It would also be possible to inform the caller immediately, if the person he or she is trying to contact is not available.

According to the state of the art, a distributed call center land virtual PBX are implemented by exploiting the normal call setup signaling of a telephone network. In this case, when contact is attempted, the state of a telephone connection forming part of a call center or virtual PBX is checked, by making a call attempt to the connection in question and checking whether it is busy or whether it replies. Thus, the check is made by attempting to connect the incoming call. In the case of a distributed call center, for example, this generally means several consecutive call attempts to different connections in the call center, to find an idle connection. In a distributed call center, an available connection is sought according to a predetermined search sequence cannot be altered in real-time, according to the state of the connections of the call center. The connections of exchanges connected by ISDN signalling can also use the so-called CCBS (Completion of Calls to Busy Subscribers) supplementary service, which permits intelligent call queuing between two individual connections.

A drawback in the state of the art is that, when a call attempt is made to a connection, the control point does not know the state of the connection. This leads to a situation, in which, when an available connection is being sought, the call attempt may be often made first to a destination number, which is busy. Unsuccessful call attempts to busy connections occupy the capacity of the telephone network, often slowing the call routing to the desired person or his or her deputy.

The invention is intended to eliminate the defects of the art disclosed above and create an entirely new type of method for implementing a virtual PBX or distributed call center.

The invention is based on recording, in a database, the information on the state of the connections controlled by a virtual PBX or distributed call center, which database is updated whenever the state of any controlled connection at all changes or is changed. The invention is also based on the fact that at least call attempts, which are made to connections controlled by a virtual PBX or distributed call center, are processed on the basis of the information available from the database. In certain embodiments of the virtual PBX, this may mean that, when a call attempt is received, either from an external telephone network or from a connection it controls, the virtual PBX checks the state of the connection and possibly other parameters, such as call barring, from the database and decides on how to route the call on this basis. Some embodiment of a distributed call center may, in for its part, route the calls on the basis of the database information, for example, to that connection of the call center that has been available for the longest time.

More specifically, the method according to the invention is characterized by what is stated in the characterizing section of claim 1.

Considerable advantages are gained with the aid of the invention.

The invention reduces the load on the telephone network, because call attempts need not be placed unnecessarily to connections that may be even far away, only to discover that they are busy.

There are embodiments of the invention that permit the flexible and dynamic operation of connections belonging to a distributed call center. Connections can then freely log in to the call center or log out from the call center, they can detach from it for a certain time, they can have necessary recovery times or they can make outbound calls, without interfering with the control of incoming telephone traffic to the call center.

The invention also has preferred embodiments, by means of which the operator of a virtual PBX can control the traffic coming to the connections of the virtual PBX in an entirely new way. In this case, calls are not directed unnecessarily to busy connections or voice mail. If the called number has activated a call diversion to a mobile phone, the PBX operator knows this and can act accordingly. In these preferred embodiments, the absences and business trips of persons being called do not cause unnecessary call attempts to their connections, instead the caller can be requested immediately to leave a message in the voice mail, with a secretary or with the deputy of the person called.

Some particularly preferred embodiments of the invention can also be used to expedite the accessibility of a person being called, for example, by using the information in the database to first try to route the calls being made to the person's extention, to the connection last used by the person. Other advanced paging routines can also preferably be linked to embodiments of the invention, such as a routine that searches for that connection in the distributed call center that has been idle for the longest time and then routes the incoming call to that connection.

When embodying the invention in a preferred manner in a distributed call center, it is also possible to implement the recovery-time function, which is often used in a call center implemented with a conventional PBX. The recovery-time function allows a person working in a call center, for example, to have enough time to record an order, before receiving the next call. Several call centers also regularly carry out so-called outbound customer contact work, i.e., the agents of the call center also make calls themselves, so that the number of agents of the call center able to receive incoming telephone traffic varies continuously. The invention has preferred embodiments, which automatically make allowance for variations in the number of agents in a distributed call center.

The invention can also be applied to a virtual PBX so that the PBX operator is able to monitor the state of the virtual PBX connections in real time. When routing a call to a connection, the operator then knows if the connection is busy, if the person using the connection is off sick or travelling, if calls are being diverted to a mobile phone or voice mail, etc. This eliminates the unnecessary circulation of calls in the telephone network and protects callers from the irritation of long waits. In the embodiment, calls can also be prevented from circulating in the telephone network even if the person sought cannot be contacted. Known virtual PBXs also allow the operator to route a call, for example, to a connection in another town, which does not answer. In such cases, the caller has usually had to call the PBX again, because the operator has been unable to monitor or direct calls controlled by other exchanges. There are embodiments of the invention that can solve this problem too.

In the following, the invention is examined with the aid of examples and with reference to the accompanying drawings.

Figure 1:
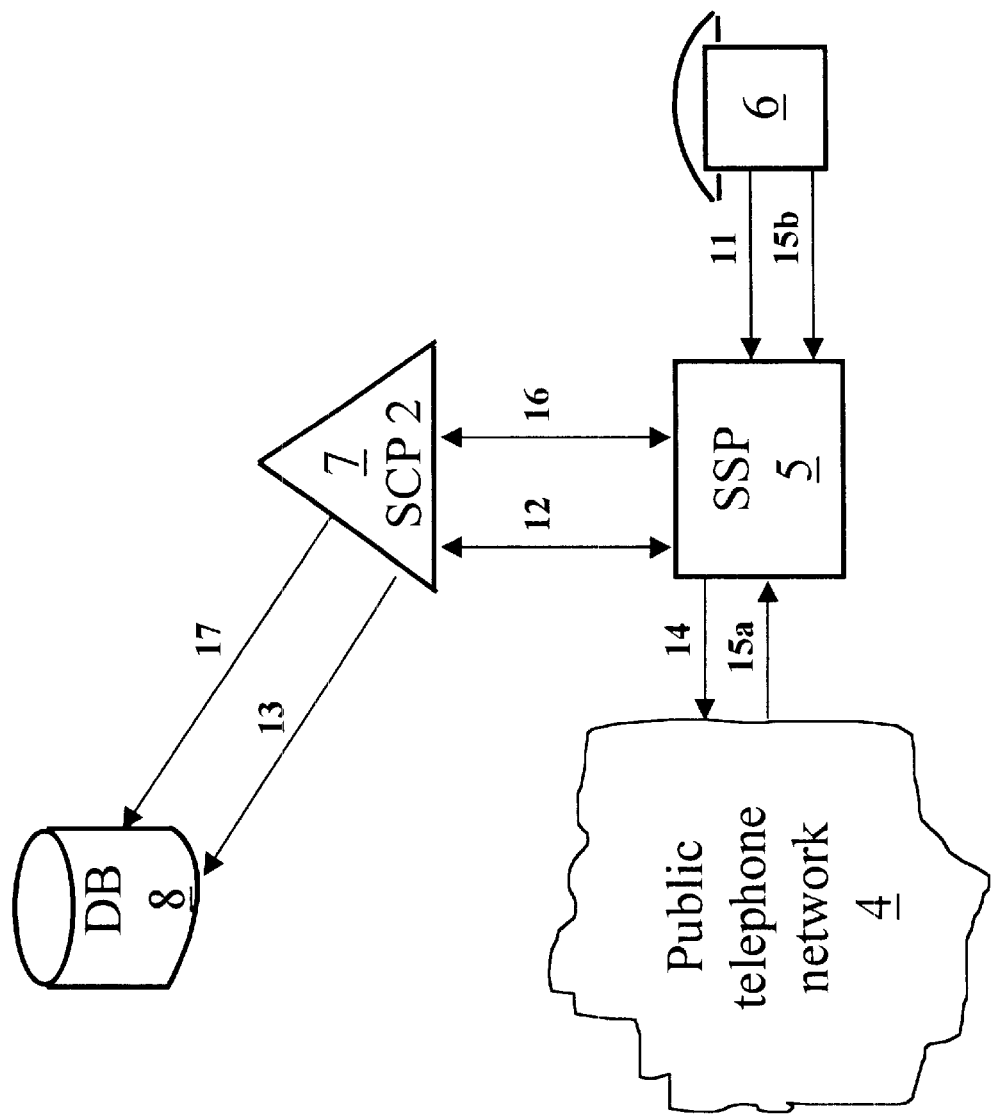
FIG. 1 shows a diagram of one method according to the invention, for updating a database DB when setting up or disconnecting an outbound call from a call center or a virtual PBX.

Each figure shows elements participating in the implementation of the function depicted by the figure, with arrows to show the actions required by said function. The elements shown in the figures are a telephone connection 1 that does not belong to the distributed call center or virtual PBX, the closest telecommunications network SSP exchange 2 (Service Switching Point) to this and the related SCP database 3 (Service Control Point), a public telephone network 4, a second SSP 5, a telephone connection 6 controlled by a distributed call center or virtual PBX in the area of the second SSP 5, an SCP database 7 connected to the second SSP 5, and a database DB 8.

According to FIG. 1, when an outbound call from a connection of a call center or virtual PBX is set up or disconnected, and, in connection with this, database DB 8 is updated, the following operations take place:

11) In connection 6 controlled by the call center or virtual PBX, the handset is lifted or number dialling is commenced in some other way.
12) The SSP 5 nearest the connection notices that the handset has been lifted ('triggers', i.e. detects the need for the intelligent network service and initiates the necessary operations) and notifies SCP 7 of this. SCP 7 responds by returning control of the call to SSP 5.
13) SCP 7 updates the data on the state of connection 6 in database DB 8, i.e., in this case the busy state of connection 6. Alternatively, SCP 7 can also be set to check from DB 8, is subscriber 6 allowed to make calls at all at the time in question. In this case, stages 12 and 13 take place in parallel, so that call control is returned only after DB 8 has been checked.
14) The call is set up normally to the public telephone network 4.
15) The call is disconnected, if
  15a) information comes from the public telephone network 4 that the call cannot be completed, or the connected call is disconnected from the direction of the B-subscriber, or
  15b) the A-subscriber 6 abandons, before the call could be completed, or else disconnects a call that has already been completed.
16) SSP 5 transmits information to SCP 7 that connection 6, controlled by the call center or the virtual PBX, has become idle.
17) SCP 7 updates the information on the state of connection 6 in DB 8, in this case signifying that connection 6 is idle.

Figure 2:
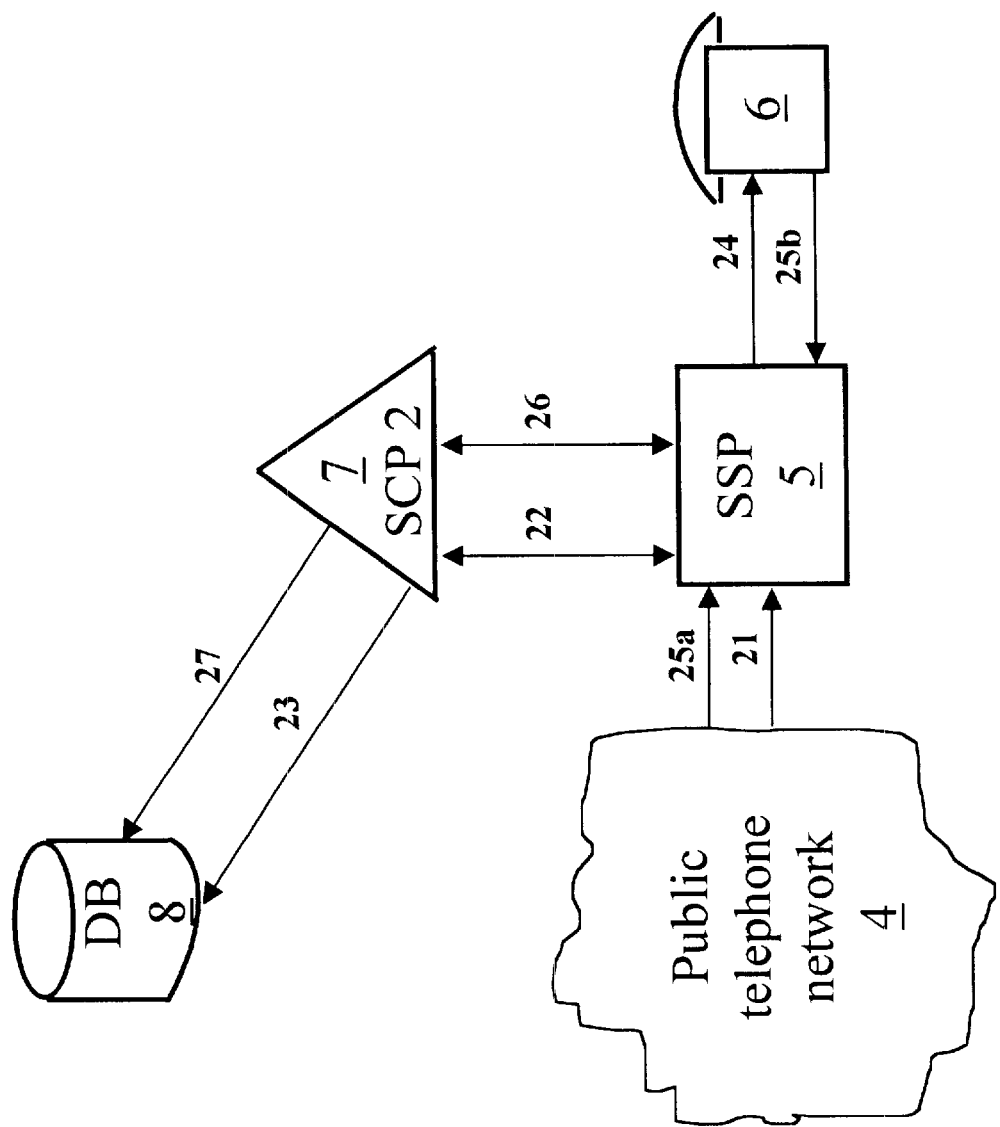
FIG. 2 shows a diagram of one method according to the invention, for updating a database DB, when setting up or disconnecting an incoming call to a call center or a virtual PBX.

According to FIG. 2, when an incoming call to a connection of a call center or virtual PBX is set up or disconnected, and, in connection with this, database DB 8 is updated, the following operations take place:

21) A call is routed from public telephone network 4 to SSP 5 of subscriber 6 in the call center or virtual PBX.
22) SSP 5 detects the call attempt to connection 6 and transmits corresponding information to SCP 7.
23) SCP 7 updates the data on the state of connection 6 in DB 8, signifying here that connection 6 is busy. Alternatively, SCP 7 can also be set to check from DB 8 whether calls can be connected to subscriber 6 at the time in question.
24) The call is connected normally to subscriber 6.
25) The call is disconnected, if
  25a) the timer of the public telephone network 4 is expires (subscriber 6 has not answered), the exchange in the public telephone network 4 cancels the call setup when its own service-specific timer expires, the connected call is otherwise disconnected from the direction of the public telephone network 4,or
  25b) subscriber 6 controlled by the call center or virtual PBX disconnects the call.
26) SSP 5 notifies SCP 7 that connection 6 of the call center or virtual PBX has become idle.
27) SCP 7 updates the data in DB 8 on the state of the connection, signifying here that connection 6 is idle.

Figure 3:
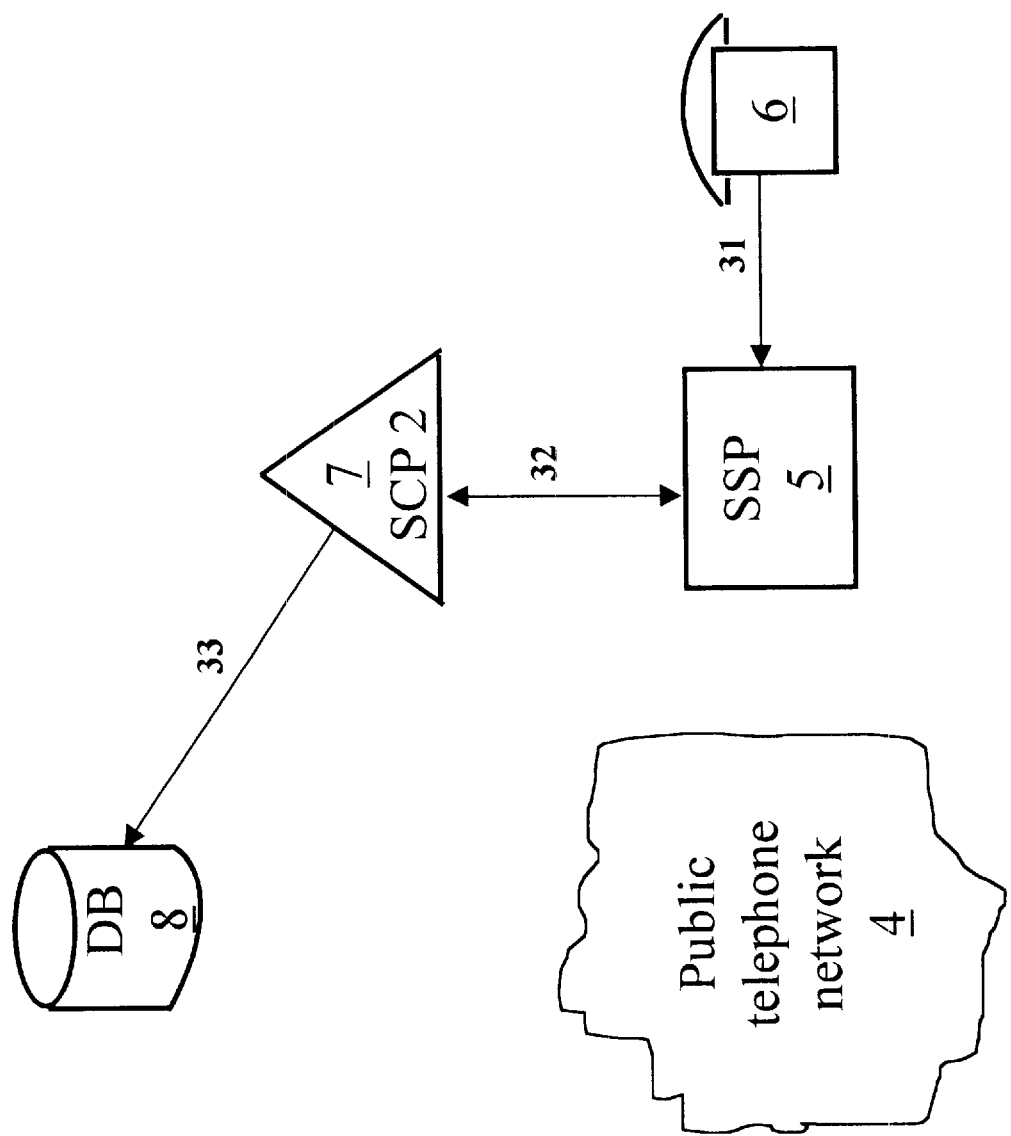
FIG. 3 shows a diagram of one method according to the invention, for updating a database DB or making a database query in the case of data on the state of a connection forming part of a call center or of a virtual PBX.

According to FIG. 3, data in DB 8 on the state of a connection controlled by a call center or a virtual PBX can be updated or queried, in which case the following operations take place:

31) A call is made from connection 6 of the call center or virtual PBX to a special number, where the caller can update or query the state data. Alternatively, the special number can be called from any connection at all, but in this case the user must be separately identified, e.g. by a username and password.
32) SSP 5 triggers on the special number, initiating the state data update service in SCP 7.
33) SCP 7 updates the states of connection 6 in DB 8. The update may concern, for example, the log in or log out of subscriber 6 to or from the call center, an entry concerning sick leave or travel, etc. Alternatively SCP 7 may query the state data of connection 6 and transmit it to subscriber 6 as voice messages.

Figure 4:
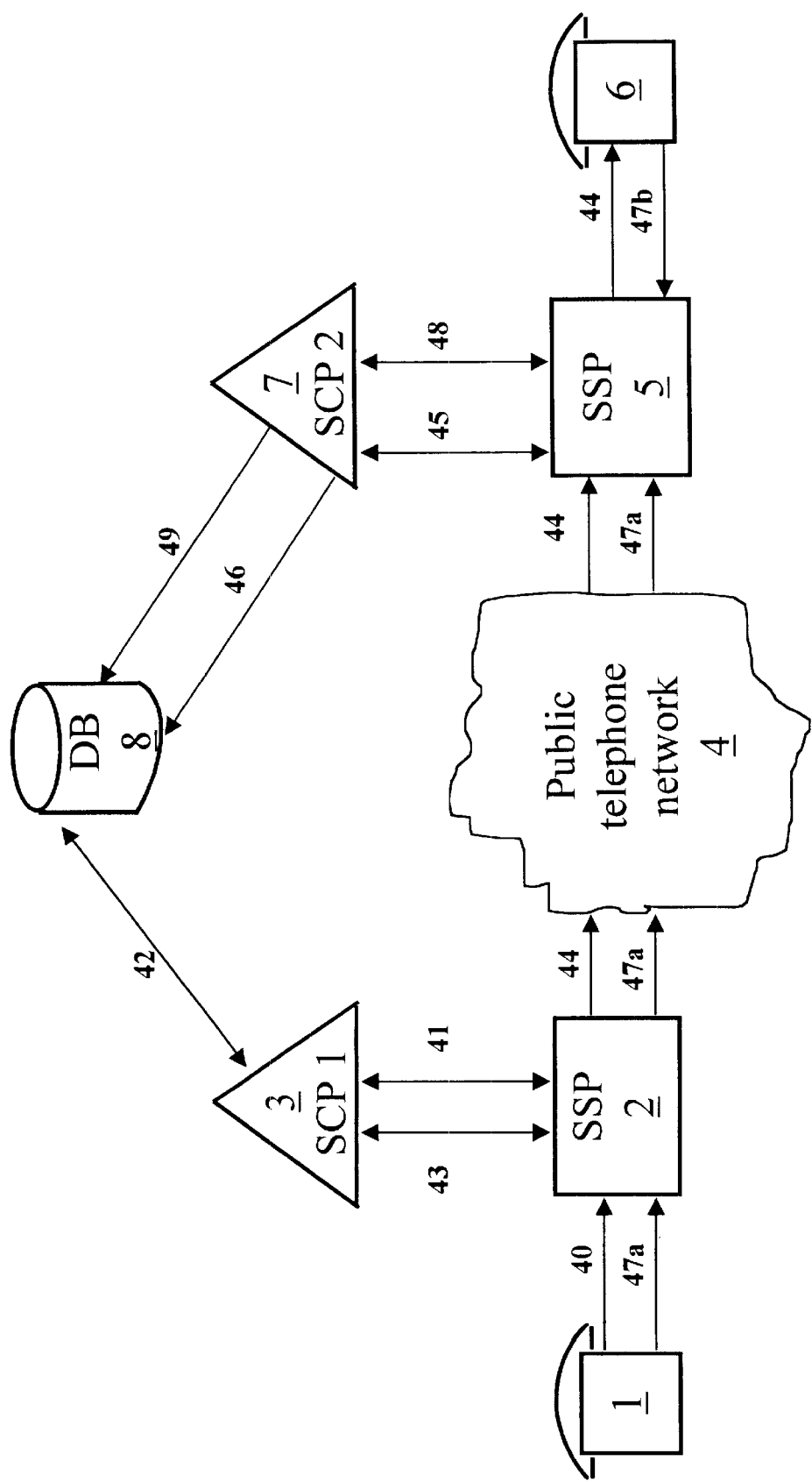
FIG. 4 shows a diagram of one method according to the invention, for routing a call made to the telephone number of the call center.

According to FIG. 4, when routing calls made to the telephone number of the call center, the following operations take place:

40) Caller 1 dials the telephone number or special number, which is routed to the call center.
41) SSP 2 of caller 1 triggers on the telephone number/special number and sends a query about this to SCP 3 connected to SSP 2.
42) SCP 3 uses its service logic to perform a search, which can take into account, e.g., the time of the call, the location of the caller, the locations of the various connections to the call center and the current state and state history of each connection, for a suitable destination number, on the basis of queries made from DB 8. Once a suitable destination number 6 has been found, SCP 3 can reserve it for the incoming call by correspondingly updating the data in DB 8.
43) SCP 3 commands SSP 2 to route the call to the relevant connection 6, through public telephone network 4.
44) The call is connected to destination number 6.
45) At the same time, SSP 5 of destination number 6 transmits information on the connected call to its own SCP 7.
46) SCP 7 updates the data in DB 8 on the state of destination number 6, signifying here that connection 6 is busy.
47) The call is disconnected, if
   47a) the timer of public telephone network 4 expires if subscriber 6 does not answer, the exchange of public telephone network 4 cancels the call setup when its own service-specific timer expires, the connected call is otherwise disconnected from the direction of public telephone network 4, or
   47b) subscriber 6 controlled by the call center or virtual PBX disconnects the call.
48) SSP 5 of subscriber 6 controlled by the call center or virtual PBX notifies SCP 7 of the idle state of connection 6.
49) SCP 7 updates the state data of connection 6 in DB 8, signifying here that connection 6 is idle.

Figure 5:
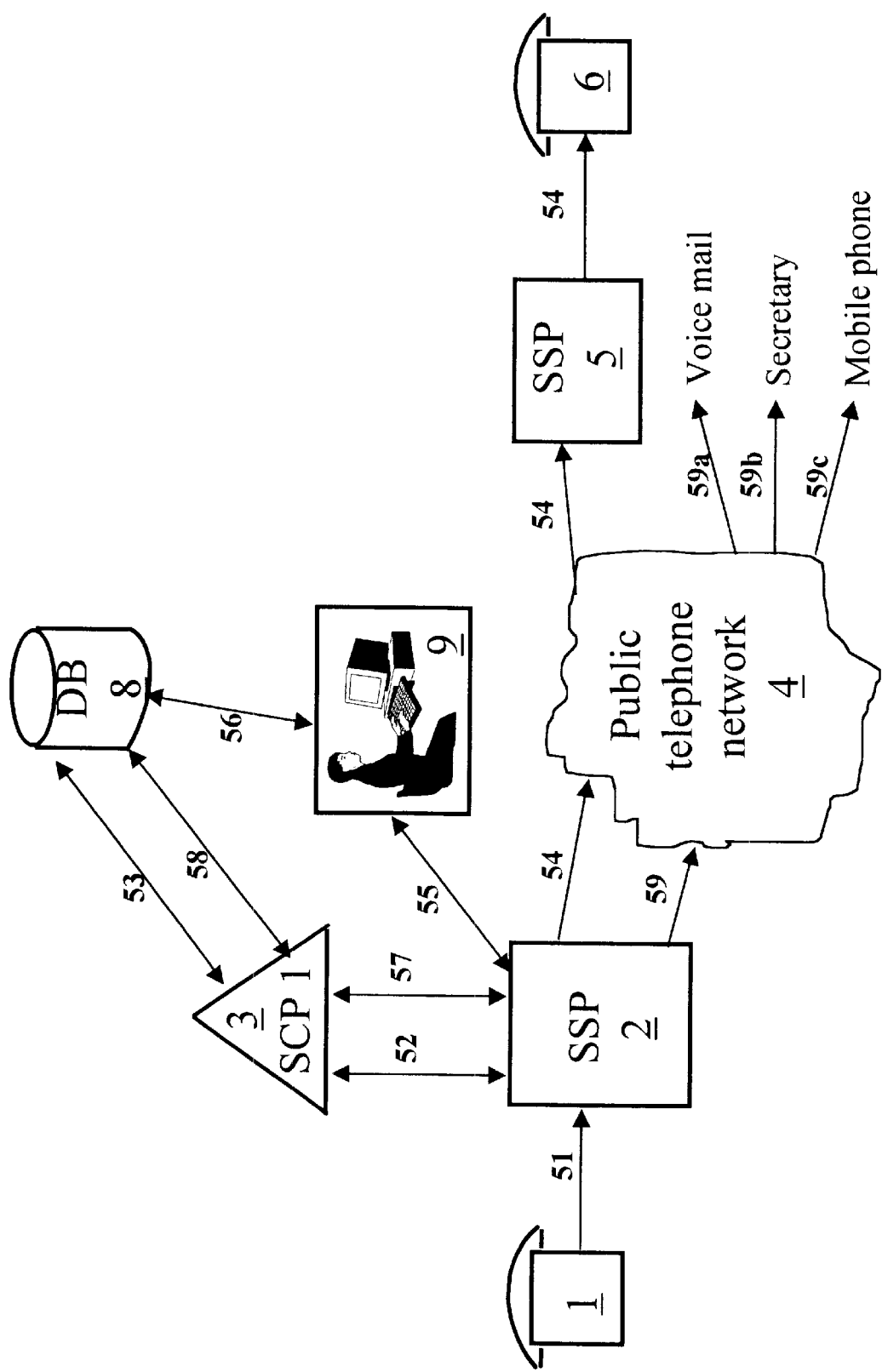
FIG. 5 shows a diagram of the actions of a PBX operator, when using one method according to the invention.

According to FIG. 5, when routing a call to a connection controlled by the a virtual PBX, the calling subscriber 1, the virtual PBX, and the operator 9 of the virtual PBX perform the following actions:

51) Caller 1 dials the telephone number of connection 6 of the Virtual PBX, which is the number of a specific person.
52) The SSP 2 closest to the caller's connection triggers on the dialled number and sends a query to SCP 3.
53) Using its service logic, which can take into consideration, e.g., the time of the call, the location of the caller, the locations of the various connections of the virtual PBX, and the current state and state history of each connections, SCP 3 seeks a suitable destination number by sending queries to DB 8. Once a suitable destination number 6 has been found, SCP 3 can reserve it for the incoming call by updating the corresponding data in DB 8.
54) SCP 3 gives SSP 2 a command to route the call to the selected destination number 6 through public telephone network 4 and, at the same time, instructs it to monitor various cases of failure in call setup.
55) If the call cannot, however, be conneced to destination number 6, SCP 3 commands SSP 2 to set up a call to the connection of PBX operator 9. SCP 3 can inform PBX operator 9 of the reason for the call diversion, either by updating DB 8, or by setting the signalling fields of the call coming to PBX operator 9 to correspond to the reason for the call diversion. The fields to be used can be, e.g., the original called number 6, redirecting number=destination number, redirection information=reason for call diversion.
56) PBX operator 9 decides which new destination number to connect the call to, on the basis of the caller's needs and the state of the various target numbers of connection 6 of the virtual PBX. He or she updates the new destination number in DB 8 and, at the same time, disconnects his or her own call to SSP 2.
57) When PBX operator 9 disconnects the call, SSP 2 sends a new query to SCP 3.
58) Correspondingly, SCP 3 sends a new query to DB 8, from which the new destination number is sought.
59) SCP 3 now commands SSP 2 to connect the call to the new destination number, e.g., to voice mail 59a, a secretary 59b, or a mobile phone 59c.

The examples given above are some of the cases that can be processed with the aid of the invention. Naturally, the invention can also be used in connection situations differing from those above. Embodiments of the invention,s differing from those disclosed above, can also be envisaged.

For example, the invention can be used to implement an embodiment, in which a distributed call center also controls outbound telephone traffic from connections belonging to the call center. This could allow, for example, outbound calls from the call center to be forbidden, if all the other connections of the call center are busy. A corresponding procedure can also be applied to direct incoming calls to the connections of the call center. A call coming to the direct number of a connection refers to a call made directly to the connection's own telephone number, and not a call routed through the telephone number of the call center. If there are fewer idle connections in the call center than a predetermined threshold value, a subscriber making a direct call can be informed that the connection in question is not receiving calls at that moment. This type of arrangement can improve the accessibility of, e.g., emergency or stand-by services.

What is claimed is:

1. A method for connecting telephone calls between connections of a public telephone network and controlled connections, i.e., public telephone network connections connected under a virtual PBX, which group of controlled connections comprises connections in the areas of at least two telephone exchanges, and, in which method
   a call attempt request directed to a telephone number connected under the virtual PBX is received,
   a controlled connection corresponding to the call attempt request is sought, and
   the call is, if possible, connected to this connection,
   characterized in that
      data on the state of each connection controlled is entered in a database (8),
      when searching for a connection corresponding to a call attempt request, data on the state of at least one controlled connection is checked front the database (8) and the data checked from the database (8) is used to decide to which controlled connection to connect the call, this step comprising the steps of:
         transmitting data on the call from the SSP (2) nearest the caller's connection (1) to its SCP (3), seeking, using the SCP (3), information on the state of the connections of the virtual PBX from the database (8), using the accessed information, in accordance with the service logic, to decide on a suitable destination number (6), reserving the suitable destination number (6) for the incoming call by updating the corresponding data in the database (8), and giving a command from the SCP (3) to the SSP (2) to route the call through public telephone network (4) to the destination number (6), and if the call cannot be connected to the destination number (6):

SCP (3) commands SSP (2) to route the call to the connection of a PBX operator (9), and SCP (3) informs the PBX operator (9) of the reason for the call diversion, either by updating the database (8), or by setting the signalling fields of the call coming to the PBX operator (9) to correspond to the reason for the call diversion.

* * * * *